United States Patent [19]
Coveley

[11] Patent Number: 5,805,105
[45] Date of Patent: Sep. 8, 1998

[54] RADIO RANGE FINDER

[76] Inventor: Michael Coveley, 45 Ironshield Crescent, Thornhill, Ontario, Canada, L3T 3K7

[21] Appl. No.: 750,542
[22] PCT Filed: May 31, 1995
[86] PCT No.: PCT/CA95/00325
§ 371 Date: Feb. 5, 1997
§ 102(e) Date: Feb. 5, 1997
[87] PCT Pub. No.: WO95/33215
PCT Pub. Date: Dec. 7, 1995

[30] Foreign Application Priority Data

Jun. 1, 1994 [CA] Canada ................................. 9410959.2

[51] Int. Cl.⁶ ..................................................... G01S 13/26
[52] U.S. Cl. ............................ 342/125; 342/42; 342/145; 342/189
[58] Field of Search .................. 342/42, 44, 46, 342/47, 125, 145, 189

[56] References Cited

U.S. PATENT DOCUMENTS

| Re. 35,607 | 9/1997 | Nagamune et al. ..................... 364/561 |
| 3,801,980 | 4/1974 | Danton et al. .............................. 342/45 |
| 4,075,631 | 2/1978 | Dumez ...................................... 342/45 |
| 4,566,009 | 1/1986 | Hanni et al. ............................... 342/45 |
| 4,646,091 | 2/1987 | Behrens ..................................... 342/47 |
| 4,862,176 | 8/1989 | Voles ......................................... 342/45 |
| 4,989,009 | 1/1991 | Zerkowitz ................................ 342/145 |
| 5,231,400 | 7/1993 | Mouldin .................................... 342/45 |
| 5,317,318 | 5/1994 | Thomas et al. ............................ 342/44 |
| 5,438,332 | 8/1995 | Adam et al. ............................... 342/45 |
| 5,515,053 | 5/1996 | Hecht et al. ............................... 342/42 |
| 5,515,056 | 5/1996 | Henderson et al. ..................... 342/125 |
| 5,726,658 | 3/1998 | Auslander et al. ...................... 342/204 |

FOREIGN PATENT DOCUMENTS

| 1254807 | 11/1971 | Canada . |
| 2274932 | 1/1976 | France . |
| 2683326 | 5/1993 | France . |

OTHER PUBLICATIONS

Mode S System Design and Architecture by John J. Baker et al., 8078 Proceedings of the IEEE 77 (1989) Nov., No. 11.

Primary Examiner—John B. Sotomayor
Attorney, Agent, or Firm—Baker & Daniels

[57] ABSTRACT

A radio range finding system includes a radio range finder and a plurality of remote mobile transponders. The radio range finder transmits a signal modulated with an address code identifying a particular mobile transponder. When a mobile transponder receives the modulated signal $M_s$ transmitted by the radio range finder and the modulated signal has been modulated with an address code that corresponds to the address assigned to that mobile transponder, the mobile transponder transponds a return signal $R_s$ to the radio range finder. A receiver in the radio range finder conveys the received signal to a mixer which also receives an internal carrier signal identical to the modulated signal output by transmitter. The output of the mixer is then filtered and demodulated to yield an output signal proportional to the distance between the mobile transponder and the radio range finder.

9 Claims, 1 Drawing Sheet

1

RADIO RANGE FINDER

TECHNICAL FIELD

The present invention relates to tracking systems and in particular to a radio range finder to measure the distance between a remote transponder and a reference location.

BACKGROUND ART

Communication systems for identifying and locating a mobile transponder from a fixed reference location are well known in the art and have been used in many environments including aeronautics. For example, one known tracking system includes an RF transmitter located at the reference location for transmitting a signal encoded with identification data which is to be received by the mobile transponders to be tracked. Upon receiving the encoded signal and determining that the encoded signal is addressed to the mobile transponder, the mobile transponder transponds a return signal at a different frequency than the original transmitted signal which is to be received by a receiver at the reference location. Ancillary and conditional functioning information of the mobile transponder can be superimposed on the transponded signal.

When the receiver receives the transponded signal, the identity and location of the addressed mobile transponder can be determined. However, although the location of the mobile transponder is known, its distance from the reference location is not readily available.

It is therefore an object of the present invention to provide a novel radio range finder and a radio range finding system to measure the distance between a remote transponder and a reference location.

DISCLOSURE OF THE INVENTION

According to one aspect of the present invention there is provided a radio range finder comprising:

a transmitter to transmit a signal to be received by a remote transponder;

a receiver for receiving a return signal from said remote transponder transponded in response to said transmitted signal; and processing means for correlating said transmitted and return signals and generating an output signal proportional to the distance of said remote transponder from said radio range finder.

According to another aspect of the present invention there is provided a radio range finding system comprising:

a transmitter to transmit a signal to be received by a remote transponder;

at least one remote transponder for receiving a transmitted signal and for transponding a return signal in response to said transmitted signal;

a receiver for receiving said return signal; and processing means for correlating said transmitted and return signals and generating an output signal proportional to the distance of said remote transponder from said receiver.

In one embodiment it is preferred that the processing means includes means to determine the delay between the transmitted and return signals and means to generate the output signal in response to the determining means. It is also preferred that the radio range finding system further includes addressing means acting in conjunction with the transmitter for addressing transmitted signals to identify a particular remote transponder. In this case, each of the at least one remote transponders includes address detection means to detect transmitted signals addressed thereto and for enabling the remote transponder to transpond a return signal when a properly addressed transmitted signal is received.

The present invention provides advantages in that the design of the radio range finder is simple yet permits accurate distance measurements between the reference location and the remote transponder to be made.

BRIEF DESCRIPTION OF THE DRAWINGS

An embodiment of the present invention will now be described more fully with reference to the accompanying drawings in which.

BEST MODE FOR CARRYING OUT THE INVENTION

Figure 1:
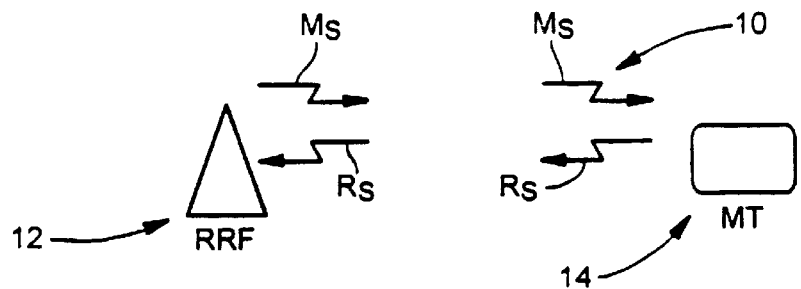
FIG. 1 is a block diagram showing the overall configuration of a full duplex radio range finding system according to the present invention.

Referring now to FIG. 1, a radio range finding system is shown and is generally indicated by reference numeral 10. System 10 includes a radio range finder 12 and a plurality of remote mobile transponders 14, only one of which is shown. The radio range finder 12 transmits a modulated signal $M_s$ which is received by each of the mobile transponders 14. The transmitted modulated signal is modulated $M_s$ with an address that is particular to one of the mobile transponders 14. When the mobile transponders receive the modulated signal, the modulated signal is examined by each mobile transponder 14 to determine if it is addressed to that specific transponder. A received modulated signal not addressed to a transponder is ignored. The mobile transponder 14 that receives the properly addressed modulated signal, responds to it by transponding a return signal $R_s$. When the radio range finder 12 receives the return signal $R_s$, it correlates the return signal and the transmitted modulated signal $M_s$ in a manner to yield an output signal representing the distance between the radio range finder 12 and the addressed mobile transponder 14.

Figure 2:
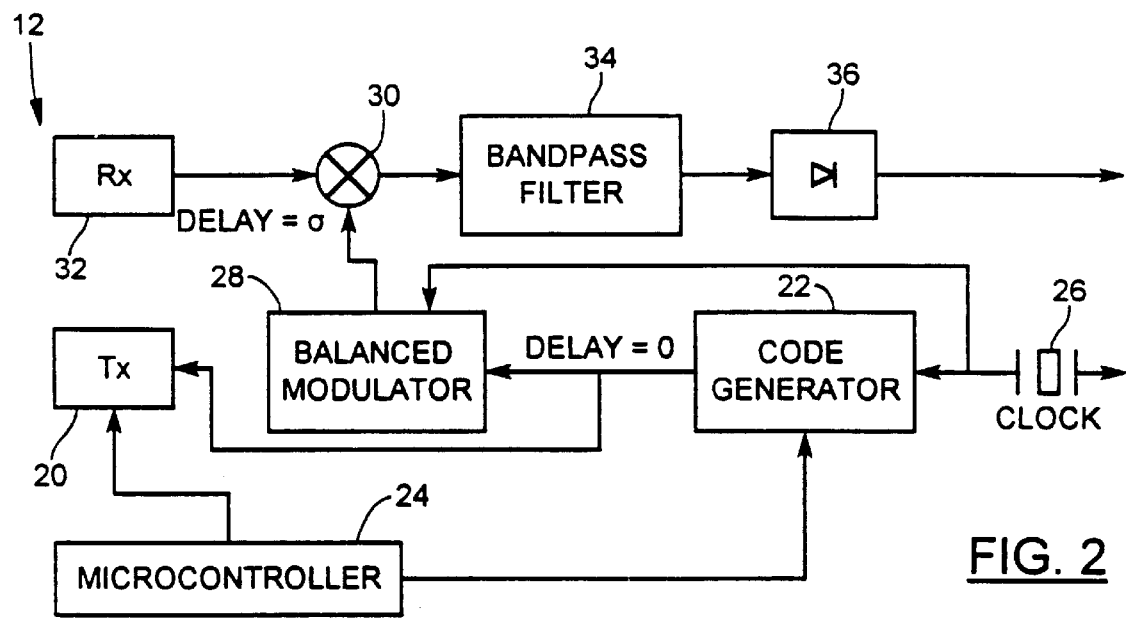
FIG. 2 is a block diagram of the radio range finder circuitry forming part of the system of FIG. 1.

Turning now to FIG. 2, the radio range finder 12 is better illustrated. As can been seen, the radio range finder includes a transmitter 20 receiving input from a code generator 22. Code generator 22 receives input from a microcontroller 24 as well as from a clock 26 and also supplies input to a balanced modulator 28. The balanced modulator 28 also receives input from clock 26 and supplies output to a mixer 30. Mixer 30 also receives input from a receiver 32 and supplies output to a bandpass filter 34. The output of bandpass filter 34 is supplied to an envelope demodulator 36 which generates an output signal proportional to the distance between the addressed mobile transponder 14 and the radio range finder 12 when a return signal $R_s$ is received after a transmitted modulated signal $M_s$ has been sent. Because the radio range finder 12 has a receiver 32 and a transmitter 20, signals can be transmitted and received simultaneously making system 10 a full duplex system.

Figure 3:
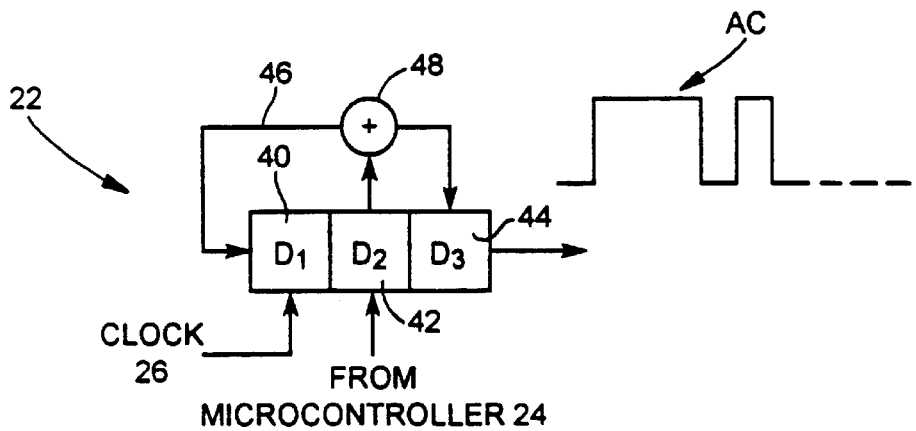
FIG. 3 is a block diagram of a chip code generator forming part of the circuitry of FIG. 2.

FIG. 3 better illustrates the code generator 22 and as can be seen, it is constructed from a set of series-connected delay elements 40, 42 and 44 respectively. The delay elements are combined in a feedback path 46. Specifically, outputs from the last delay element 44 and the intermediate delay element 42 are combined within a modulo-2 adder 48 and fed back to the input of the first delay element 40. The contents of the code generator 22 are initialized by the microcontroller 24.

The operation of the radio range finding system 10 will now be described. When it is desired to determine the distance between a mobile transponder 14 and the radio range finder 12, the microcontroller 24 provides input to the code generator 22 to initialize it so that the code generator 22 generates an output code representing the address of the mobile transponder 14 whose distance from the radio range finder 12 is to be determined. The address code AC (see FIG. 3) output by the code generator 22 is supplied to the transmitter 20. The transmitter 20 in turn generates and transmits a quasi spread-spectrum carrier signal having a frequency f1 modulated by the address code. The address code AC is also supplied to the balanced modulator 28 which modulates an internal carrier signal that is the same as the signal transmitted by the transmitter.

When the modulated signal $M_s$ is transmitted, all of the mobile transponders 14 receive the transmitted modulated signal. Each mobile transponder 14 includes address detection circuitry designed to detect a modulated signal that has been modulated with an address code that corresponds to the address assigned to that mobile transponder. If a transmitted modulated signal is received by a mobile transponder that is modulated by an address code that does not correspond to the address assigned to that mobile transponder, the mobile transponder ignores the received modulated signal. However, if the modulated signal received by the mobile transponder 14 is modulated with an address code that corresponds to the address assigned to that mobile transponder, the mobile transponder is enabled and transponds a return signal $R_s$ having a carrier frequency f2.

Figure 4:
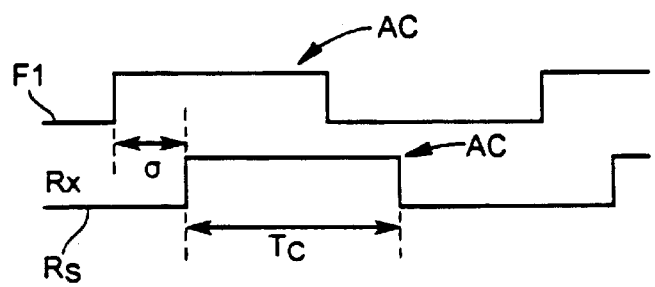
FIG. 4 is a diagrammatic representation of an original transmitted signal, a return signal received from the transponder, and the time delay between the two signals.

When the return signal $R_s$ is received by receiver 32, it is applied to the mixer 30 which also receives the modulated internal carrier signal from balanced modulator 28. Since the modulated internal carrier signal is identical to the original transmitted modulated signal $M_s$, the mixer 30 has available to it, the originally transmitted and return signals. FIG. 4 shows the modulated internal carrier signal and the return signal $R_s$ both modulated by an address code AC. The delay σ between the carrier and return signals and the duration $T_c$ of the address code are also shown. The output of the mixer 30 is filtered by bandpass filter 34 and is then passed through envelope demodulator 36 so that the return and internal carrier signals are correlated to yield an analog voltage output which is directly proportional to the delay σ between the original transmitted modulated signal $M_s$ and the return signal $R_s$. The delay σ can be expressed as:

$$\sigma = d/c;$$

where:
d is equal to the distance between the radio range finder 12 and the remote mobile transponder 14; and
c is equal to the propagation of radio signals through the environmental media through which they are travelling.

Since the speed of light and the delay σ are known, the analog voltage output of the envelope demodulator 36 is proportional to the distance d between the radio range finder 12 and the addressed mobile transponder 14. The analog voltage output can be calibrated and converted to digital form to yield a numerical value representing the distance d. The digital signal representing the distance d can be used to drive a display to provide a visual indication of the distance.

The maximum distance d that can be measured using system 10 is determined by the equation:

$$d = c \times T_c; \tag{1}$$

where:
c is the propagation of radio signals through the environmental media through which they are travelling; and
$T_c$ is the duration of an address code generated by code generator 22.

The duration of an address code is of course determined by the clock speed and the number of bits in the address code.

For example, in a system 10 where the output rate of the code generator 22 is 1 Mbit/sec, a signal bandwidth of 2 MHz is provided. The maximum distance between the radio range finder 12 and a mobile transponder 14 that can be measured is 300 m using equation (1) assuming $T_c = 1\,\mu s$ and $c = 3 \times 10^8$ m/s. Also, in this example, if an eight bit analog to digital convertor is used to convert the analog voltage to a digital distance valve, the voltage can be transformed with a resolution of 300 m/256=1.17 m.

Although the system 10 has been described as a full duplex system including a receiver 32 and a transmitter 20, it should be realized that a half-duplex transceiver can be used to function individually as both the transmitter and the receiver. However, it should be realized that in this case, signals cannot be transmitted and received simultaneously.

Also, the analog output voltage can be calibrated and used to generate an analog display to provide a visual indication of the distance d and does not need to be converted into digital form.

As should be apparent to those of skill in the art, other modifications and variations are possible without departing from the scope of the present invention as defined by the appended claims.

What is claimed is:

1. A radio range finder comprising:
   a code generator for generating a code;
   a transmitter in communication with said code generator and transmitting a signal modulated using said code, said transmitted signal to be received by a remote transponder;
   a receiver for receiving a return signal modulated by said code from said remote transponder, said return signal being transponded in response to said transmitted signal;
   a modulator in communication with said code generator for generating an internal modulated carrier signal generally identical to said transmitted signal; and
   a processor receiving said modulated return signal and said internal modulated carrier signal, said processor correlating said signals to determine the delay therebetween and generating an output signal proportional to the distance between said remote transponder and said radio range finder.

2. A radio range finder as defined in claim 1 wherein said output signal is in the form of an analog voltage having a magnitude directly proportional to said distance.

3. A radio range finder as defined in claim 1 wherein said code represents the address of a particular remote transponder, said radio range finder further comprising a microcontroller for initializing said code generator.

4. A radio range finder as defined in claim 3 wherein said code generator includes a plurality of series-connected delay elements.

5. A radio range finder as defined in claim 4 wherein said code generator includes a first delay element, a second delay element, a third delay element and an adder, said first delay element supplying input to said second delay element and said second delay element supplying input to said third delay element and to said adder, said third delay element supplying output to said modulator, transmitter and adder, said adder supplying input to said first delay element.

6. A radio range finder as defined in claim 1 wherein said processor includes a mixer receiving said return signal and said internal modulated carrier signal, a bandpass filter receiving the output of said mixer and an envelope demodulator receiving the output of said bandpass filter and generating said output signal.

7. A radio range finding system including a radio range finder as defined in claim 1 and further comprising at least one remote transponder for receiving said transmitted signal and for transponding said modulating return signal in response to said transmitted signal.

8. A radio range finding system as defined in claim 7 wherein said at least one remote transponder is mobile.

9. A method of determining the distance between a radio range finder and a remote transponder comprising the steps of:

generating a code;

modulating a signal using said code and transmitting said signal to said remote transponder;

receiving a return signal modulated by said code from said remote transponder in response to said transmitted signal;

generating an internal modulated carrier signal generally identical to said transmitted signal; and correlating said return signal and said internal modulated carrier signal to determine the delay therebetween and generating an output signal proportional to the distance between said radio range finder and said remote transponder.

* * * * *